July 22, 1952     J. F. O'BRIEN ET AL     2,604,316
SNAP DISK SPRING
Filed Dec. 19, 1945     2 SHEETS—SHEET 1
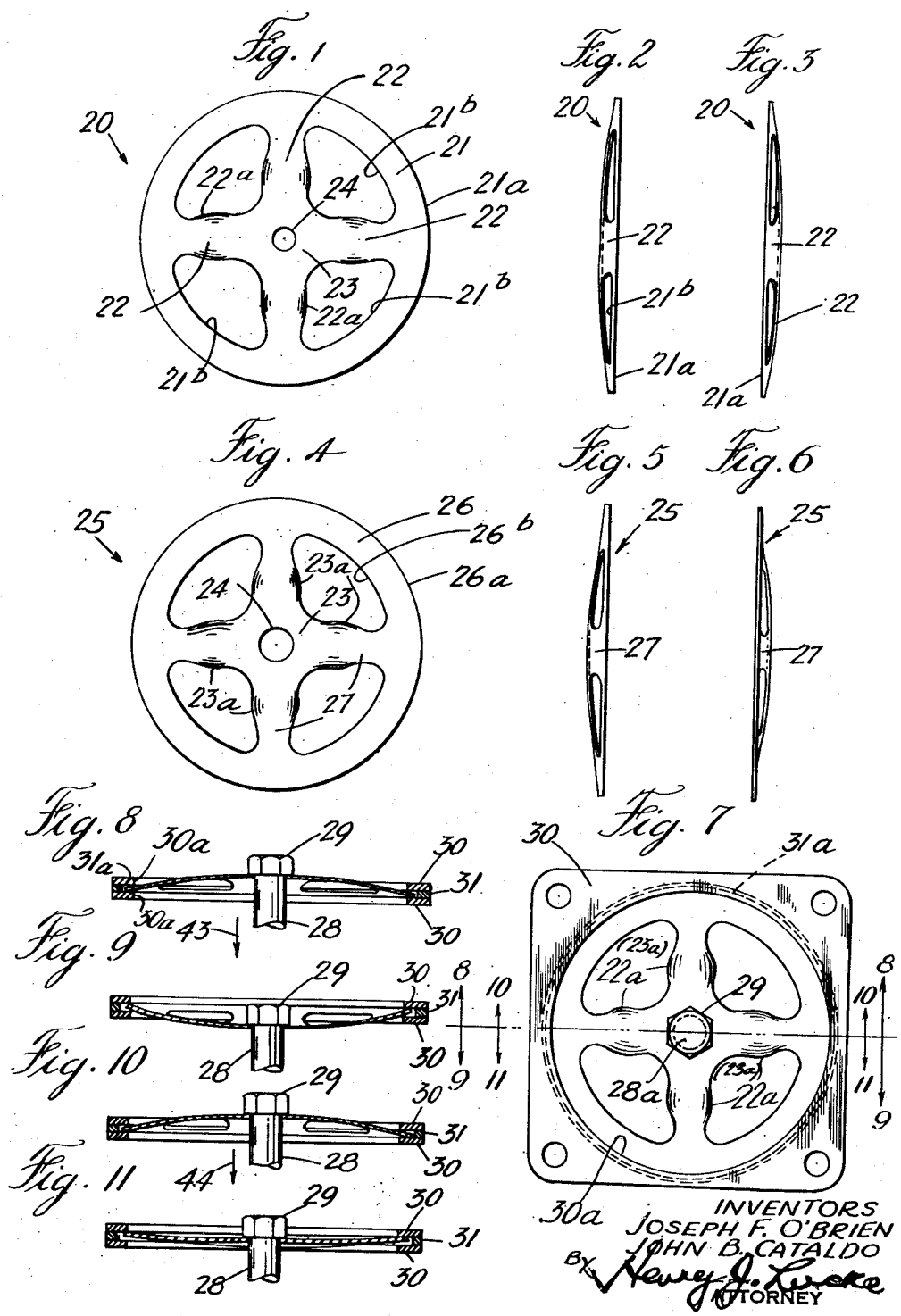
INVENTORS
JOSEPH F. O'BRIEN
JOHN B. CATALDO
BY
ATTORNEY July 22, 1952 J. F. O'BRIEN ET AL 2,604,316
SNAP DISK SPRING
Filed Dec. 19, 1945 2 SHEETS—SHEET 2
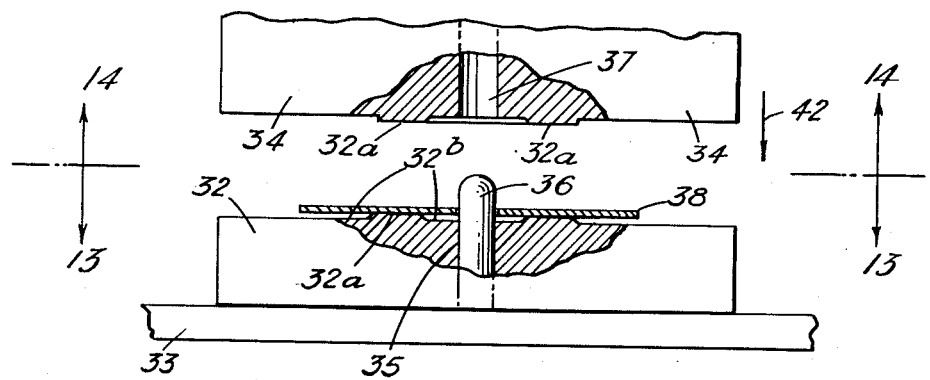
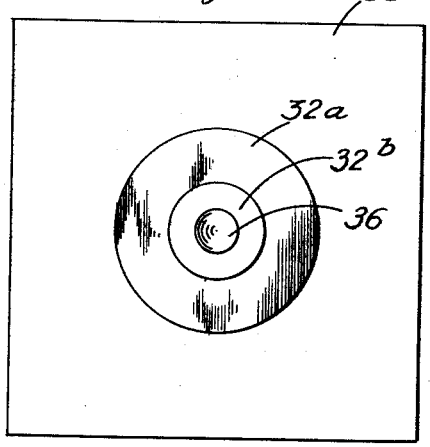 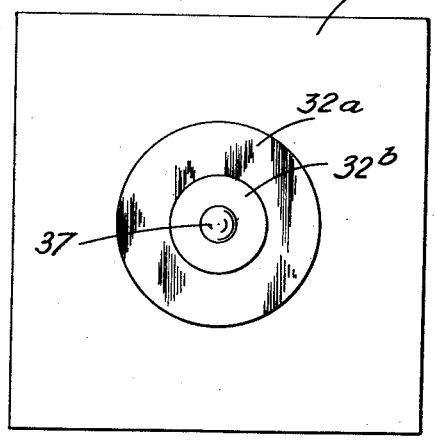
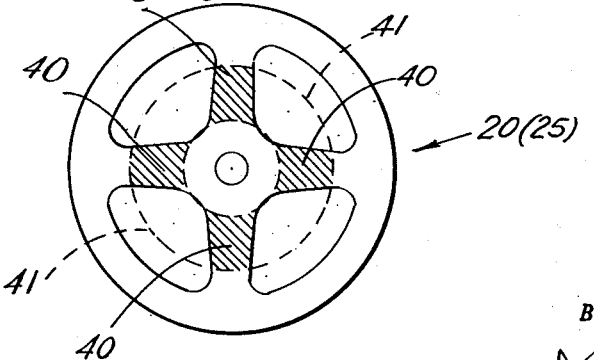
INVENTORS
JOSEPH F. O'BRIEN
JOHN B. CATALDO
BY Henry J. Lucke
ATTORNEY Patented July 22, 1952

2,604,316

UNITED STATES PATENT OFFICE 2,604,316

SNAP DISK SPRING

Joseph F. O'Brien, Lebanon, and John B. Cataldo, Annandale, N. J., assignors to John B. Pierce Foundation, New York, N. Y., a corporation of New York Application December 19, 1945, Serial No. 635,956

4 Claims. (Cl. 267—1)

The present invention relates to snap disk springs.

Pursuant to the invention, snap disk springs are produced of metal or other suitable material possessing selectively either two positions of stable equilibrium or but a single position of stable equilibrium.

Snap disk springs pursuant to the invention comprise each a rim portion, spoke portions connected at their outward extremities to the inner periphery of the rim portion and a central zone portion integrally connected to the inward extremities of the spoke portions, and are characterized by the spoke portions being bowed relative to the rim and central zone portions.

In practical uses, generally, snap disk springs embodying the instant invention are mounted at their respective peripheries and are connected at their central zone, usually provided with a perforation, with an actuated or actuating element. Applications of such practical uses are described and illustrated in the copending applications of Joseph F. O'Brien and John B. Cataldo, Ser. No. 589,204, filed April 19, 1945, now Patent No. 2,537,080, granted January 9, 1951 for Reverse Current and Circuit Breaker Ser. No. 594,396, filed May 18, 1945, entitled Reverse Current Circuit Breaker, now abandoned pursuant to which disclosures the concerned snap disk springs serve to actuate elements which control contact-carrying members in the assembly of electric circuit breakers.

Snap disk springs pursuant to the invention advantageously have each an annular rim of outer circular periphery and an inner periphery of circular arcs, intermediate of which are integrally connected three or more radial legs or spokes, usually mutually symmetrically arranged; the inner extremities of such legs or spokes are integrally connected to a central zone portion which is usually provided with a recess or opening, affording connection with an actuated or actuating element.

Snap disk springs pursuant to the invention are produced preferably of metals or like materials inherently possessing resiliency. The most preferred materials are beryllium-copper alloys, Phosphor bronze, Z-metal, cold roll spring steel and the like. Plastics possessing appropriate spring characteristics may also be used.

When formed of metal, blanks are stamped from sheets of such material and then treated in an appropriate die assembly whereby the spoke portions of the blank are subjected to compression, thereby elongating the spoke portions as well as increasing the hardness of their compressed portions, whereupon the spoke portions assume a bowed or arcuate formation with respect to the rim and the central zone portion. By such procedure, the material of the rim and of the central zone of the blank is undisturbed. Thus, the spoke portions have work-hardened areas so that they are bowed to effect bowing of the entire disk spring. Snap disk springs produced as stated, possess two positions of stable equilibrium, one position being that as effected by the original treatment in the die assembly, and its other position of stable equilibrium being attained by inside-out movement of its central zone and bowed spokes with respect to the rim.

Snap disk springs pursuant to the invention embodying a single position of equilibrium are produced by subjecting the disk after treatment in the die assembly as above described, to elevated temperature to a value depending upon the metal, whereby the stresses induced in the portions of the spokes subjected to compression, are released, resulting in imparting substantially uniformly distributed tension in the material of the bowed members.

This application is a continuation in part of our copending application Ser. No. 589,204, filed April 19, 1945.

Further features and objects of the invention will be more fully understood from the following detailed description and the accompanying drawings, in which—

Fig. 1 is a plan view of a preferred embodiment of the invention, possessing two positions of stable equilibrium. Fig. 2 is an edge elevational view of Fig. 1, showing the snap disk spring in one of its two positions of stable equilibrium. Fig. 3 is an edge elevational view of the embodiment shown in Fig. 1, illustrating the same in its other position of stable equilibrium.

Fig. 4 is a plan view of another embodiment of the invention, possessing but one position of stable equilibrium. Fig. 5 is an elevational edge view of Fig. 4, showing the same in its single position of stable equilibrium. Fig. 6 is an elevational edge view of the embodiment shown in Fig. 4, showing the same in its unstable position, that is to say, when held in such position by some form of applied force.

Fig. 7 is a plan view of the embodiments respectively illustrated in Figs. 1 and 4, shown mounted in a suitable peripheral mounting means.

Fig. 8 is a detail sectional view on line 8—8 of the mounting assembly of Fig. 7 with respect to the embodiment illustrated in Fig. 1, namely in its position of stable equilibrium illustrated in Fig. 2. Fig. 9 is a detail sectional view on line 9—9 of the mounting assembly of Fig. 7 with respect to the embodiment illustrated in Fig. 1, namely in its position of stable equilibrium illustrated in Fig. 3.

Fig. 10 is a detail sectional view on line 10—10 of the mounting assembly of Fig. 7 with respect to the embodiment illustrated in Fig. 4, namely in its position of stable equilibrium illustrated in Fig. 5. Fig. 11 is detail sectional view on line 11—11 of the mounting assembly of Fig. 7 with respect to the embodiment illustrated in Fig. 4, namely in its position of unstable equilibrium illustrated in Fig. 6.

Fig. 12 is a diagrammatic view of one form of suitable die assembly, parts of the anvil and hammer components of which are broken away at their respective central portions to expose otherwise hidden parts. Fig. 13 is a detail sectional view on line 13—13 of Fig. 12, the disk blank being omitted. Fig. 14 is a detail sectional view on line 14—14 of Fig. 12.

Fig. 15 is a diagrammatic plan view of a blank for a snap disk spring corresponding generally to Fig. 1, and indications of the areas of elongation and compression of the spoke portions of the blank.

Referring to Figs. 1, 2 and 3 of the drawings, the snap disk spring, designated generally 20, comprises an outer rim 21 shown of general annular formation having an outer circular periphery 21a and an inner periphery 21b formed of symmetrically disposed, mutually spaced arcs. Integrally connected with the rim 21 at its inner periphery are spoke portions 22 which extend to and are connected integrally with the central zone portion 23. The number of spoke portions may be as desired, usually at least three and advantageously four in number and in mutually symmetrical relationship. The central zone portion 23 is provided with a recess, shown in the illustrated embodiment as an opening, 24 for connection with an actuating or actuated element, as presently appears.

Figs. 2 and 3 show the preferred embodiment having two positions of stable equilibrium in its positions, Fig. 2 showing one such position and Fig. 3 the other position, explained more fully hereinafter.

Fig. 4 and Figs. 5 and 6 illustrate another preferred embodiment of the invention having but a single position of stable equilibrium, namely that illustrated in Fig. 5. Referring to the component parts of this type of embodiment of the invention, designated generally 25, 26 indicates its rim, shown as having an outer circular periphery 26a and an inner circular periphery formed of component arcs 26b. Its spoke portions are designated 27, shown four in number, corresponding to the like number of spoke portions of the embodiment shown in Figs. 1, 2 and 3.

Fig. 7 illustrates one manner of mounting the stated two types of snap disk spring by peripheral lodgment of the rim portion and connected at the central zone with an actuating or actuated element 28, as by providing the reduced and threaded end portion 28a of such element 28 which is positioned within the opening 24 and secured by the locking nut 29 or equivalent. Fig. 8 represents the two position type of snap spring disk in one of its positions of stable equilibrium and the corresponding stable position of the element 28. Fig. 9 represents the two position type of snap disk spring in its opposite position of stable equilibrium and the corresponding stable position of the element 28.

Specifically, the peripheral lodgment means as illustrated in Fig. 7 comprises a pair of retaining plates 30, 30, shown having outer rectangular, i. e. square, configuration and having inwardly a circular configuration indicated at 30a and of a diameter slightly less than the diameter of the outer periphery of the thus mounted snap disk spring. Intermediate the plates 30 is disposed a spacer ring 31 having a corresponding outer rectangular, i. e. square, configuration and an inner diameter 31a sufficiently greater than the outer periphery of the rim of the snap disk spring and having a thickness to provide sufficient clearance between the plates 30, 30 to afford unobstructed displacement of the peripheral portion of the rim of the snap disk spring in its inside-out movement from one position to its other position, and vice versa.

Figs. 8 and 9 illustrate the mounting of the two position type of snap disk spring in the mounting assembly shown in Fig. 7. Fig. 8 represents the snap disk spring 20 and the actuated or actuating element 28 in one stable position and Fig. 9 in the other stable position.

Figs. 10 and 11 illustrate the single position type of snap disk spring mounted in the assembly of Fig. 7, Fig. 10 showing the stated snap disk spring 25 and the element 28 in position of stable equilibrium, and Fig. 11 representing their positions of unstable equilibrium.

Fig. 12 represents diagrammatically a suitable type of die assembly which has proven effective in the production of snap disk springs of the respective types above set forth. The die member 32 serves as the anvil and is shown resting upon a suitable support indicated at 33; the complementary die member, indicated 34, serves as the hammer. The die member 32 is shown provided with a recess 35 in which is positioned an aligning pin 36 cooperating with a recess 37 formed in the die member 34, to insure proper operation of the component parts of the die assembly. 38 represents a blank, shown of uniform thickness, which may be stamped of suitable resilient metal or molded of suitable resilient plastic. The die member 32 is provided with a relief flat face portion 32a of annular outline, whereby the remainder of the face of the die member 32 inwardly and outwardly, see 32b, 32b, is depressed relative to the annular relief face 32a. The complementary, i. e. hammer, die member 34 has an annular relief face 32a and depressed faces 32b, 32b of same formation, dimension and position.

Fig. 13 is a top plan view of the anvil component of the die assembly, the disk blank being removed, and Fig. 14 is a bottom plan view of the hammer component of the die assembly.

In the operation of the die assembly, the hammer member is forced downwardly in the direction of the arrow 42, indicated in Fig. 12, imparting a blow effected by the relief faces 32b upon the blank disk 38 at predetermined areas and at predetermined pressure.

Fig. 15 diagrammatically illustrates at 40, 40, 40, 40, the areas of the respective four inward, i. e. legged, portions of the concerned snap disk spring which are subjected to compression in the operation of the die assembly, pursuant to the invention. The dash line 41 appearing in Fig. 15 represents the outer diameter of the respective die relief faces 32b, 32b. Upon removal of the worked blank from the die assembly 32, 34, the same takes the formation indicated in Fig. 1, resulting in a snap disk spring having two positions of stable equilibrium, as hereinabove explained. It will be observed that the leg portions are flared outwardly as indicated at 22a, 22, etc., as indicated in Fig. 1, and similarly at 23a, 23a, etc., as indicated in Fig. 4.

When it is desired to obtain a snap disk spring having a single position of equilibrium, the snap disk spring produced pursuant to the above described procedure is subjected to heat treatment. A satisfactory heat-treating process is had by placing the snap disk spring in an oven yielding a temperature of, say, 600° F. and allowing it to remain under such elevated temperature until the stresses engendered in the spoke portions of the disk are equalized after which the disk is allowed to cool.

Test results have shown that snap disk springs of the two position type possess a snapping force of the range of sixteen to eighteen pounds, for a disk having an outer rim diameter of 1¼ inches, an inner diameter of approximately 1 inch, having four spoke portions each of approximately ⅛ inch width and a thickness of the original blank of .017 inch.

For snap disk springs of the single position type utilized in the reverse current circuit breakers of the type described and illustrated in the stated copending applications Ser. No. 589,204 and Ser. No. 594,396, the heat treatment may range from one hour to two hours, yielding snap disk springs having a snapping force of the range of sixteen to eighteen pounds, when released from unstable position and requiring but four to six pounds to be held in unstable position. Single position disk springs of the stated characteristics embodied in the stated types of reverse current circuit breakers test for the life of 100,000 cycles. Snap disk springs for a higher life are obtained by lessening the maximum snapping force.

The snapping force of snap disk springs pursuant to the invention is controlled by the degree of the pressure blow effected in the die assembly applied to the concerned areas of the spoke portions of the snap disk spring.

As appears from the comparative figures, namely Figs. 8 and 9, respecting the two position type of snap disk spring upon application of force applied to the element 28, the central zone portion 23 of the snap disk spring is displaced in the direction of the arrow 43, indicated in Fig. 8, whereupon the spoke portions 22 are flexed in the stated direction inwardly of the rim portion of the disk until the central portion 23 attains a position in advance of the fulcrum plane passing through the outer perimeter of the rim portion, whereupon the central portion 23 and the spoke portions 22 partake of their joint inside-out movement, imparting a forceful snap action upon the element 28. In such movement the rim portion 21 pivots upon itself about a shifting fulcrum afforded by successive contact with the two mounting plates 30 within the clearance therebetween. The final position, namely a position of stable equilibrium of this type of snap disk spring, is illustrated in Fig. 9. The reverse inside-out movement, engendering thereby forceful snap action imparted to the element 28 from the position of this type of snap disk spring from its position in Fig. 9 to that of Fig. 8, ensues in like manner, as just described.

Practical utilization of the two position type of snap disk spring is general where a snap spring action is applicable for two positions of stable equilibrium. In the employment of such type of spring in the assembly of a circuit breaker, such snap disk spring may actuate or be actuated by a plunger, which may function as an armature or be actuated by an armature, associated with suitable electrical coils, such as solenoidal coils through the core of which the plunger reciprocates, and this controls a contact-carrying member for closing and opening a load or other electrical circuit.

With reference to the one position type of snap spring 25, assuming its stable position as illustrated in Fig. 10, force is applied to the element 28, whereupon the central zone of the disk is displaced in the direction of the arrow 44 indicated in Fig. 10 and consequent flexing of the spoke portions 27, and subsequent flexing of the rim portion 26, such operation taking place in a manner generally similar to that of the stated two position type of snap disk spring but of relatively less resistance encountered in effecting the inside-out movement of this type of disk spring. Fig. 11 illustrates a normally assumed position of the single position type of snap disk spring, when in its unstable position. When the single position type of snap disk spring is released from its unstable position, namely from its Fig. 11 position to its Fig. 10 position, the pressure force exerted upon the actuated element 28 is of a snap character of high intensity. This type of snap disk spring has general application of uses in which the stated characteristics of stability and instability are of advantage. When employed as a component part in the assembly of a reverse current circuit breaker, such as is described and illustrated in said copending applications Ser. No. 589,204 and Ser. No. 594,396, the element 28 is actuated either manually as in manual setting or electromagnetically as by means of an electrical coil, the element 28 serving as a plunger which is controlled by an armature in turn controlled by the electrical coil, desirably of the solenoidal type; the plunger is positively held in its unstable position when the reverse current relay is in its load-circuit-closing position, as by a latching mechanism. Under reverse current condition, such latch is released whereupon the single position disk spring snaps back automatically by reason of its unstable position and thereby opens the load circuit.

It is pointed out that in both types of snap disk springs, above set forth, the force exerted by the flexing of the rim portion in the inside-out movement of the disk spring is imparted at an acceleration exceeding that of the force exerted by the flexing of the spoke portions, and by reason of the integral connection of the spoke portions at the inner periphery of the rim portion, the thus combined imparted forces produce a resulting snap action of high magnitude, considering the relatively small dimensions of the component parts of the snap disk spring.

Variation of snap action and resulting exerted force of the two types of disk springs is had by forming the respective stated portions of the disk spring of relatively different thicknesses. Variation of the width of the respective stated spoke portions of the disk spring also results in corresponding variation of the snap action imparted to the actuated element connected thereto; however, uniform width of the spokes of any given snap disk spring yields optimum spring action.

Variation of the pressure force imparted by the snap disk spring, pursuant to the invention, may also be attained by varying the areas of the respective spoked portions which are subjected to compression and consequent elongation, as well as by varying the degree of compression at the stated areas.

We claim:

1. A snap disk spring of inherently resilient material comprising: an annular rim portion; a central zone portion; and a plurality of spokes integrally connecting said rim portion and said central zone portion, said spokes only having work-hardened areas so that they are bowed to effect bowing of the entire disk spring.

2. A snap disk spring of inherently resilient material comprising: an annular rim portion; a central zone portion; and a plurality of spokes integrally connecting said rim portion and said central zone portion, the material of said spokes only being compressed to bow said spokes relatively to said rim portion and said central zone portion, said spokes being of greater hardness than said rim portion or said central zone portion; in combination with an element connected with said central zone portion; whereby upon inside-out movement of said snap disk spring said element is actuated.

3. A snap disk spring of inherently resilient material comprising: an annular rim portion; a central zone portion; and a plurality of spokes integrally connecting said rim portion and said central zone portion, the material of said spokes only being denser relatively to that of said rim portion and that of said central zone portion, said spokes being bowed relatively to said rim portion and said central zone portion.

4. A snap disk spring of inherently resilient material comprising: an annular rim portion; a central zone portion; and a plurality of spokes integrally connecting said rim portion and said central zone portion, the material of said spokes only being compressed to bow said spokes relatively to said rim portion and said central zone portion, said spokes being of greater hardness than said rim portion or said central zone portion; and the internal stresses being equalized in the compressed material of said spokes; in combination with an element connected with said central zone portion; whereby upon inside-out movement of said snap disk spring said element is actuated.

JOSEPH F. O'BRIEN.
JOHN B. CATALDO.

REFERENCES CITED

The following references are of record in the file of this patent:

UNITED STATES PATENTS

| Number | Name | Date |
|---|---|---|
| 1,593,511 | Spencer | July 20, 1926 |
| 1,654,320 | Colby | Dec. 27, 1927 |
| 1,865,185 | Greenwald | June 28, 1932 |
| 2,015,545 | Bletz et al. | Sept. 24, 1935 |
| 2,042,754 | Winkler | June 2, 1936 |
| 2,291,455 | Dumaine | July 28, 1942 |